United States Patent [19]

Albert, Jr.

[11] 4,174,463
[45] Nov. 13, 1979

[54] CONTRACTION TERMINATION DEVICE AND METHOD

[75] Inventor: Frank Albert, Jr., Parma, Ohio

[73] Assignee: Preformed Line Products Company, Cleveland, Ohio

[21] Appl. No.: 832,184

[22] Filed: Sep. 12, 1977

[51] Int. Cl.$^2$ ............................................. H02G 15/06
[52] U.S. Cl. ....................................................... 174/79
[58] Field of Search ................................ 174/79, 74 R

[56] References Cited

U.S. PATENT DOCUMENTS

| | | | |
|---|---|---|---|
| 1,966,929 | 7/1934 | Kellems | 174/135 |
| 2,143,985 | 1/1939 | Kellems | 339/101 |
| 2,934,595 | 4/1960 | Earle | 174/79 X |
| 3,133,725 | 5/1964 | Lanum | 254/134 |
| 3,264,602 | 8/1966 | Schwartz | 339/103 |
| 3,294,894 | 12/1966 | Stillman, Jr. | 174/79 |
| 3,450,829 | 6/1969 | Paul | 174/89 |
| 3,487,160 | 12/1969 | Johnson | 339/101 |
| 3,829,937 | 8/1974 | Metzler | 174/79 X |
| 3,858,992 | 1/1975 | Eucker | 174/79 X |
| 3,940,732 | 2/1976 | Hudson et al. | 174/79 X |

*Primary Examiner*—R. N. Envall, Jr.
*Attorney, Agent, or Firm*—Fay & Sharpe

[57] ABSTRACT

A contraction termination device and method for electrical conductor cable or the like encased in a sheathed braided material. The device employs an elongated sleeve having opposed lead and terminal ends with an internal passageway communicating therebetween. The sleeve tapers outwardly from the lead end along a tapered area which merges into a roughened area which then merges into an intermediate area. These three areas are all coated for creating a friction surface along the sleeve. The internal cable conductors or strands are passed through the sleeve passageway from the lead end and the braided sheath is passed over the sleeve lead end to the intermediate area. Thereafter, the sheath is affixed to the sleeve at the intermediate area by tie wraps and the ends of the conductors or strands may be conveniently interconnected to attendant equipment at the sleeve terminal end. A protective covering is received over the sleeve in preferably a close embracing relationship therewith and may comprise a heat shrinkable tube. A separate protective housing may also be received over the sleeve with the housing including means for supporting and gripping the cable outwardly from the sleeve lead end to provide cable bending strain relief and to maintain the integrity of the cable termination.

29 Claims, 5 Drawing Figures

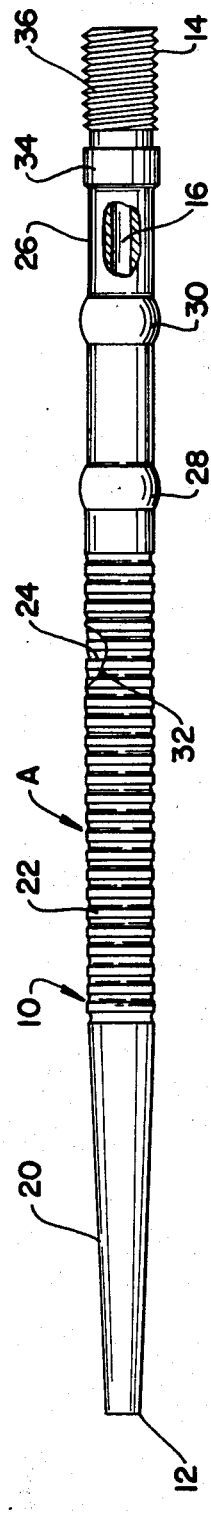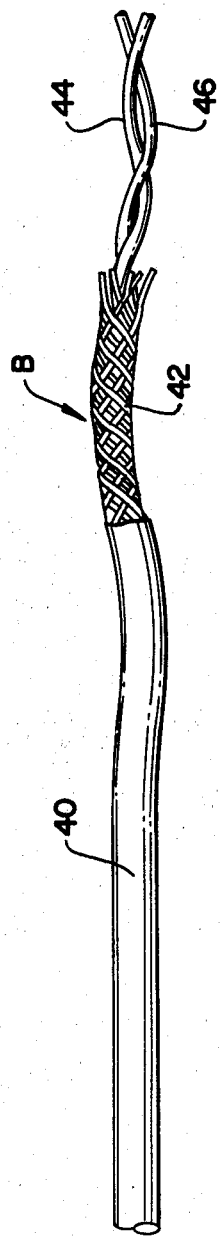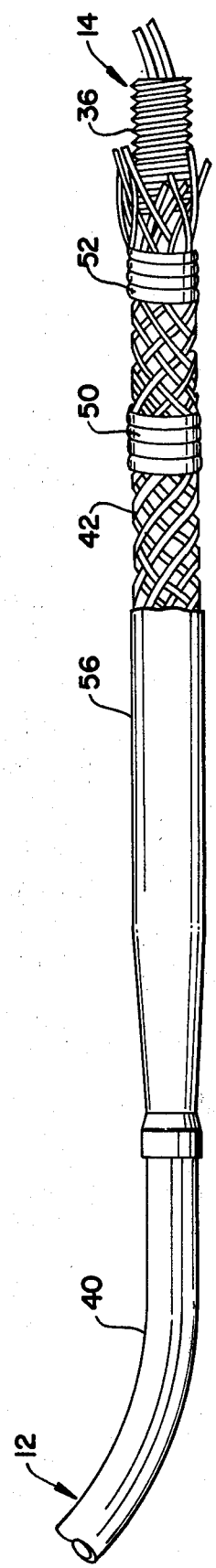

CONTRACTION TERMINATION DEVICE AND METHOD

BACKGROUND OF THE INVENTION

This development pertains to the art of connectors and more particularly cable termination devices.

The concept involved is particularly applicable to use as a contraction termination or terminal end fitting in connection with electrical conductor cable or the like encased in a sheathed braided synthetic material and will be described with particular reference thereto. Cables of this general type and with which the subject invention finds advantageous application are used particularly in undersea applications such as when an electronic monitoring array is towed through the ocean by a surface vessel. Electrical monitoring arrays of many types are used for security and defense purposes as well as undersea research. However, it will be apparent to those skilled in the art that the invention has broader applications and uses in other environments which utilize sheathed braided cable or the like.

Heretofore, there has been considerable difficulty experienced in providing terminal fittings for sheathed braided cables. These difficulties stemmed from the fact that prior termination or terminal end fitting designs were rather complicated so that field installation and use thereof was made rather difficult and ineffective. Indeed, and in many situations, field installation was impossible. Such prior end fittings were also fairly expensive. Many prior designs employed external means for exerting compressive stresses on the cable elements in order to retain the cable in position on the termination device. However, the compressive stresses thus exerted resulted in an undesirable lessening of cable strength and reliability.

Moreover, many prior termination or terminal end fittings were such that the basic components were not universally applicable to thereby necessitate separate component designs for accommodating the specifics of different cable configurations as well as the specifics of different arrays in connection with which they were used. Thus, it was necessary to stock any number of different termination or terminal end fitting designs for accommodating different cable applications and installations in the field.

Accordingly, it has been desired to provide a contraction termination or terminal end fitting which overcomes the above noted problems. The subject device meets this need and provides a contraction termination device and method which are simple in design, inexpensive, easy to use and install in the field, provide a termination connection which is substantially as strong as the cable itself, does not exert destructive compressive forces on the cable elements and which facilitate use in conjunction with many and varied cable installations.

BRIEF DESCRIPTION OF THE INVENTION

In accordance with the present invention, there is provided a contraction termination device for a length of cable or the like having inner strands surrounded at least by a braided sheath. The device comprises an elongated sleeve having opposed lead and terminal ends with an internal passageway communicating between these ends. The sleeve itself tapers outwardly over at least a longitudinal portion thereof from the lead end toward the terminal end. The cable inner strands are received through the passageway from the sleeve lead end and the braided sheath is received over and in a surrounding relationship with at least a portion of the sleeve from the sleeve lead end. Affixing means retain the braided sheath over and in the surrounding relationship with the sleeve thereby attaching the cable itself to the termination device.

In accordance with another aspect of the present design, at least that portion of the sleeve receiving the braided sheath is advantageously coated to provide a friction surface, prevent cable pull-off and distribute stresses and loads uniformly to all the cable strength members.

A protective sleeve covering or tube is also disposed over the sleeve and associated braided sheath. This covering aids in protecting the braided sheath from the environment and other potentially injurious elements.

A portion of the sleeve adjacent the tapered area includes a roughened area extending longitudinally therealong and adjacent this roughened area is an intermediate area which includes at least one peripherally disposed radially outward extending collar-like area.

In accordance with yet a further aspect of the present device, an elongated protective housing may be installed over the sleeve. The housing preferably includes a nose area which supports the cable outwardly of the sleeve lead end for providing cable bending strain relief and preventing cable chaffing. In addition, the housing may include means for gripping the cable outer cover outwardly from the sleeve lead for preventing relaxation of the mechanical connection between the cable and sleeve.

In accordance with still another aspect of the present concept, a contraction termination method for a length of cable or the like having inner strands surrounded at least by a braided sheath is provided. The method comprises the steps of:

(a) inserting the inner strands through an internal passageway in an elongated sleeve from the lead end thereof;

(b) passing a portion of the braided sheath surrounding the inner strands over and in a surrounding relationship with a longitudinal portion of the sleeve from the lead end; and, (c) affixing the braided sheath to the sleeve at an area thereof spaced longitudinally from the lead end.

A principal object of the present concept is the provision of a new contraction termination device and method which provide vastly improved termination connections over prior known termination devices and methods.

Another object of the concept is the provision of a new contraction termination device and method which are simple in design and easy to use in practical applications.

Yet a further object of the design is the provision of a new contraction termination device and method readily adaptable to use in cable termination applications in many different environments.

BRIEF DESCRIPTION OF THE DRAWINGS

The concept may take physical form in certain parts and arrangements of parts, a preferred embodiment of which will be described in detail in this specification and illustrated in the accompanying drawings which form a part hereof and wherein:

FIG. 1 is a side view of the sleeve utilized in practicing the concepts of the subject invention with portions thereof shown in partial cross-sectin for ease of illustration;

FIG. 2 is a view of a typical sheathed braided cable for which the subject invention finds particular termination applications;

FIG. 3 is a view in partial cross-section showing a cable mounted to the sleeve in accordance with the concepts of the subject invention;

DESCRIPTION OF THE PREFERRED EMBODIMENT

Figure 4:
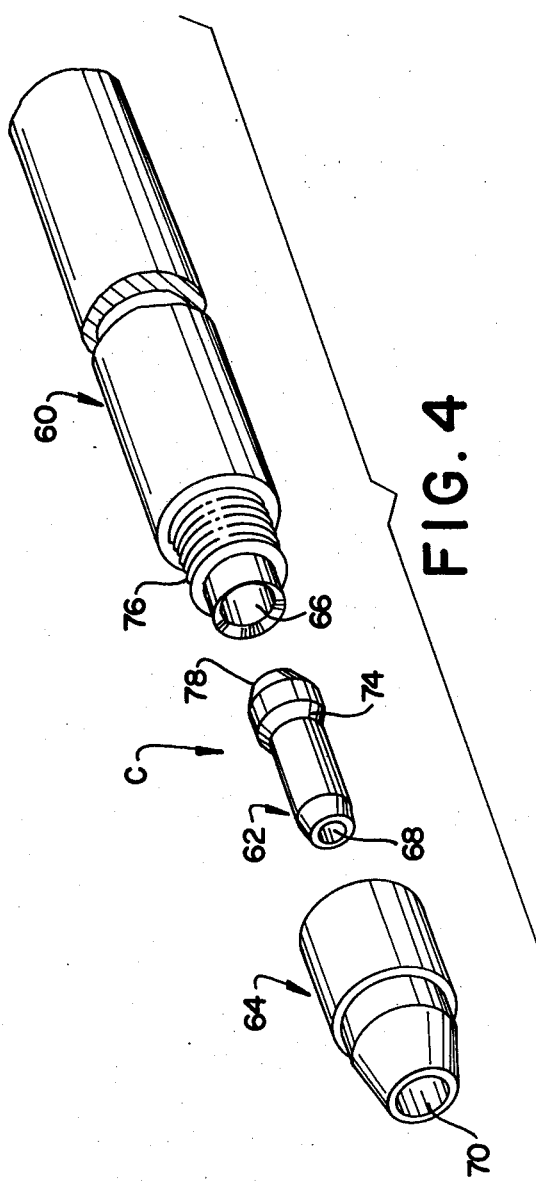
FIG. 4 is an exploded partial perspective view of an outer protective housing which may be advantageously employed in practicing the concepts of the subject device; and, FIG. 5 is a cross-sectional view of a termination device and protective housing installation with a slightly modified sleeve design.

Referring now to the drawings wherein the showings are for purposes of illustrating the preferred embodiment of the invention only and not for purposes of limiting same, the FIGURES show an elongated termination sleeve A adapted to receive a sheathed cable B and a protective housing C.

More particularly, and with reference to FIG. 1, termination sleeve A is comprised of an elongated generally cylindrical sleeve body 10 having a lead end 12 and an opposed terminal end 14. An internal passageway 16 passes axially through the sleeve body and communicates with the lead and terminal ends. While sleeve body 10 could be constructed from any number of materials, metal, such as steel, is preferred.

Body 10 includes a tapered area 20 extending longitudinally therealong from lead end 12. This tapered area merges into a roughened area generally designated 22 which has a plurality of spaced-apart ridge-like areas 24 disposed circumferentially therearound. These ridge-like areas may be comprised of serrations, flanges and such and are provided for purposes which will become more readily apparent hereinafter. Roughened area 22 merges into an intermediate area generally designated 26 which includes a pair of spaced-apart radially outward extending collar-like areas 28,30 disposed circumferentially therearound. Use of areas 28,30 will be further described hereinafter.

In the preferred arrangement, tapered area 20, roughened area 22 and intermediate area 26 are all coated by a thin layer or bedding 32 of urethane or similar material to provide high friction surfaces. As noted in FIG. 1, layer or bedding 32 decreases somewhat the severity of pronouncement for ridge-like areas 24 in roughened area 22. In conjunction with providing friction surfaces, layer 32 aids in preventing cable pull-off from the termination device and assists in distributing stresses and loads to all cable members by deflecting in proportion to cable strength member loads.

Disposed adjacent intermediate area 26 is a radially outward extending flange 34 with a threaded area 36 extending axially therefrom to sleeve terminal end 14. This threaded end is utilized for mounting the overall termination connection device in a manner which will be more readily appreciated hereinafter.

FIG. 2 generally shows the type of cable for which the subject invention finds particular application and use. Such cable is comprised of an outer protective cover 40 normally constructed from a plastic material. Beneath cover 40 is a sheathed braided material 42. A synthetic material commonly used for encasing electric conductors, telephone conductors and the like is manufactured by E. I. du Pont de Nemours and Company and marketed under the trademark KEVLAR. In FIG. 2, the inner strands or conductors are designated by numeral 44,46. The construction of cable B itself does not itself form any part of the present invention and is known in the art and the typical cable construction shown in FIG. 2 is merely for purposes of appreciating the manner of operation for the subject contraction termination device and method. Sheathed braided material 42 may thus be constructed from any number of other synthetic materials and the specific number of inner strands or conductors may vary from the two shown and designated 44,46 in FIG. 2.

With reference to FIG. 3, description will hereinafter be made of the manner of installation for a cable on the subject contraction termination device. First, outer protective cover 40 and braided sheath 42 are stripped back from strands or conductors 44,46 a distance sufficient to facilitate passing of conductors through axial passageway 16 in sleeve A from lead end 12 and for appropriate interconnection thereof to whatever attendant equipment is electronic or other monitoring equipment is employed. Outer protective cover 40 is stripped further back from braided sheath 42 a distance approximately equal to the distance from sleeve lead end 12 to flange 34. Thereafter, strands or conductors 44,46 may be passed through sleeve passageway 16 while braided sheath 42 is passed over the outside of the sleeve body tapered, roughened and intermediate areas 20,22 and 26 so that the end thereof is adjacent flange 34. Such installation is made possible since the sheath has a braided construction and will expand somewhat to permit its receipt over slightly larger sleeve body 10.

When positioned as noted, mechanical fastening means are preferably employed at two spaced apart locations at intermediate area 26 to retain the cable on the sleeve. In the preferred arrangement, tie wraps are conveniently and advantageously employed. These tie wraps simply comprise elongated members tightly wrapped around the braided sheath and sleeve with the opposite ends of each wrap tied together for completing a mechanical attachment. Any number of materials could be employed for the wraps themselves and they could be comprised of the parent material of sheath 42. Moreover, other types of mechanical fastening or bonding means could be advantageously employed without in any way departing from the overall intent and scope of the present invention. In the preferred embodiment here under discussion, one tie wrap 50 is disposed between collar-like areas 28,30 and the other tie wrap 52 is disposed between collar-like area 30 and flange 34. The two collar-like areas 28,30 in conjunction with ridge-like areas 24 on roughened area 22, retain braided sheath 42 and, thus, the entire cable structure, in a mounted position on sleeve A. When so installed, bedding or layer 32 which provides a friction surface for sleeve areas 20,22 and 26, also acts to prevent sheath pull-off to distribute stresses and loads more uniformly to all of the sheath forming members by deflecting proportionally to sheath member loads. In fact, it has been found that the subject termination device and method provides a cable holding strength of up to 90 percent of the rated strength of the cable itself.

Finally, an elongated tube-like outer covering or sleeve generally designated 56 in FIG. 3 is provided for covering sheath 42 and sleeve member A. In the preferred embodiment, a close embracing relationship for the cover is employed and the cover itself is constructed from a plastic material such as polyvinylchloride. However, other surrounding relationships between the cover and the sheath and sleeve member as well as other materials for the cover could also be satisfactorily employed. Outer covering or sleeve 56 is dimensioned and positioned to slightly overlap outer protective cover 40 of cable B and extend to sleeve flange 34. To obtain the preferred tightly embracing relationship between covering 56 and the sleeve, the cover may be conveniently heat shrunk around the sleeve after it has been positioned therein. Such heat shrinking is accomplished by known techniques which do not, themselves, form any part of the present invention.

Application of plastic covering or sleeve 56 protects that portion of the braided sheath 42 disposed over sleeve A from damage during use of the contraction termination device and aids in preventing the sheath from being contacted with destructive environmental elements such as ultraviolet light. Still further, the close embracing relationship between cover 56 and the sleeve further aids in assuring that sheath 42 and the rest of the cable will be tightly retained in position on the termination device.

The termination as described above may be conveniently affixed to device mounting means through use of threaded end 36. Threaded end 36 facilitates threaded mounting of the device to a mounting plate, manifold or similar device and inner strands or conductors 44,46 may be conveniently interconnected to and with the associated attendant equipment.

If desired, and with reference to the general showing in FIG. 4, a generally cylindrical protective housing C may be advantageously utilized for further protecting the connection of cable B to sleeve A. In the preferred arrangement, the housing is comprised of an elongated main housing portion 60, a nose member 62 and a compression gland 64. These components are configured for assembly in a cooperative relationship with each other and in a cooperative relationship with the sleeve itself as will be further described.

Through openings 66,68 and 70 are provided in members 60,62 and 64, respectively, for purposes of receiving cable B and/or sleeve A. Generally, nose member 62 includes a radially outward extending shoulder 74 adapted to cooperate with a radially inward extending shoulder on compression gland 64. Main housing portion 60 includes a threaded area 66 adapted to threadedly receive compression gland 64 with nose member outer end face 78 of main housing portion inner end face 80 adapted to cammingly cooperate with each other. The more specific details of protective housing C will be described in greater detail hereinafter and main housing portion 60, nose member 62 and compression gland 64 may be advantageously constructed from a wide variety of metallic or plastic materials.

Figure 5:
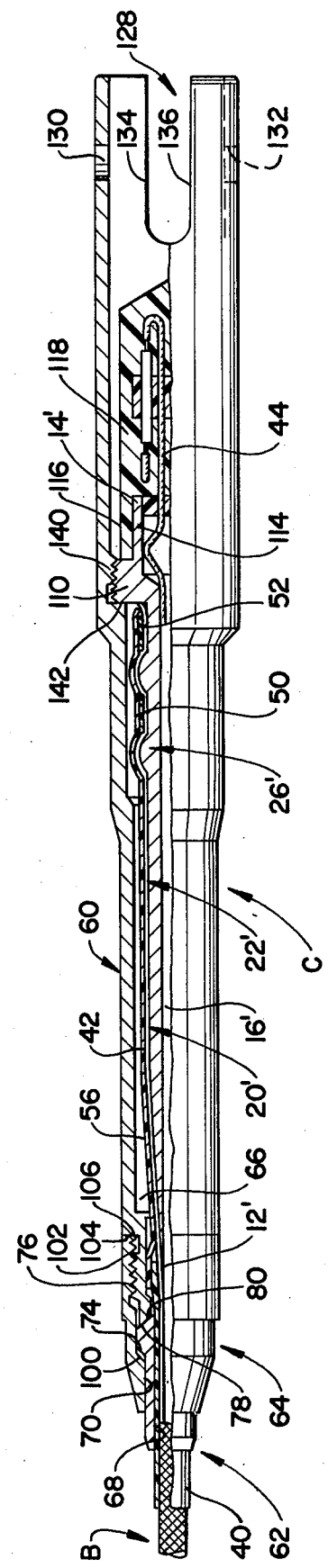

FIG. 5 shows installation of generally cylindrical protective housing C on a termination sleeve and cable wherein the terminal end of the sleeve has a slightly different configuration from that shown in FIGS. 1-3 for accommodating a separate electrical lead out member. Accordingly, like components of the sleeve are identifed by like numerals with the inclusion of a primed (') suffix for ease of illustration and appreciation of the invention.

It should be first noted that the components of protective housing C are threaded onto cable B prior to the time that the cable is affixed to the termination sleeve in the same manner described above with reference to FIGS. 1-3 and are thereafter run up onto the sleeve. Through opening 68 in nose member 62 is dimensioned to be fairly closely received over cable outer protective covering 40. Through opening 70 in compression gland 64 is dimensioned to be fairly closely received over nose member 62 and includes an internal shoulder 100 configured to engage external shoulder 74 on the nose member. Shoulders 74,100 are preferably angled slightly from a plane passing transversely through the housing for providing a slight camming action. An internal threaded area 102 adjacent the outer end of the compression gland is adapted for threaded receipt on threads 76 of main housing portion 60. Nose member outer end face 78 and main housing portion inner end face 80 are also angled relative to a plane passing transversely through the housing so that face 78 will be cammed inwardly by face 80 when the housing is assembled.

Thus, as compression gland 64 is threadedly advanced onto the main housing portion with end faces 78,80 engaging one another, at least the end of nose member 62 adjacent end face 78 will be driven toward positive engagement with outer protective cover 40 of cable B. The dimensional relationships between main body portion 60, nose member 62 and compression gland 64 are such that when the components have been assembled on the cable, the outer end face 104 of the compression gland will be closely spaced to an outer shoulder 106 on the main body portion. As will be seen in FIG. 5, through opening 66 in the main body portion substantially increases in diameter at various longitudinally spaced intervals for accommodating the basic termination sleeve and cable connection.

In the slightly modified arrangement for the sleeve, flange 110 adjacent intermediate area 26' includes threads 112 on the outer peripheral surface thereof. A smaller diameter thin walled sleeve-like area 114 extends longitudinally outward from flange 110 toward sleeve terminal end 14'. Sleeve-like area 114 is adapted to closely retainingly receive the forward mounting sleeve or end 116 of a conductor lead-out member generally designated 118. Member 118 may comprise a sealed electrical leadout and in FIG. 5, conductor 44 is shown as being affixed thereto, it being appreciated that conductor 46 would be somewhat similarly affixed. Moreover, any number of other alternative conductor mounting or lead-out arrangements could be advantageously employed without in any way departing from the overall intent or scope of the present invention. The specifics of this connecting member do not form a specific part of the present invention and the member 118 in FIG. 5 is merely shown as an example of one alternative inner strand or conductor mounting from that shown with regard to the termination device shown and described with reference to FIGS. 1-3.

Disposed adjacent the terminal end 128 of main housing portion 60 are a pair of opposed through openings 130,132 and a pair of opposed axial slots 134,136. These openings and slots are employed for conveniently mounting the housing and contraction termination to a mounting plate or manifold for practical application and for providing lead-out areas for the conductors. It should be appreciated, however, that the terminal end of main housing portion 60 may be modified as deemed necessary and/or appropriate to accommodate different desired contraction termination mounting needs and/or different constructions for conductor connecting member 118. Such changes are in no way deemed to depart from the overall intent or scope of the present invention. Main housing portion 60 includes an internal threaded area 140 adapted to be threadedly received on threads 112 of flange 110. Moreover, a radially inward extending shoulder 142 positively locates the main housing portion on the termination sleeve at flange 110.

An additional benefit provided when using the above described protective housing C resides in spacial relationship of nose member 62 to sleeve lead end 12'. As will be seen in FIG. 5, nose member 62 is spaced adjacent to and outwardly from the sleeve lead end. Further, the housing is installed on the sleeve in the manner described above, compression gland 64 acts to drive nose member 62 axially toward main housing portion 60 so that by the interaction between outer and inner end faces 78,80, the nose member physically grips the cable around the outer protective cover 40. These features provide two specific benefits. First, the nose member provides cable bending strain relief by maintaining cable bending away from the actual mechanical termination between the cable and termination sleeve. This assists in protecting the integrity of the mechanical cable termination. Still further, the gripping action between nose member 62 and cable cover 40 prevents any relaxation of the mechanical gripping relationship between the cable and termination sleeve when tension on the cable is relaxed. This also assists in protecting the integrity of the overall termination joint. The slight gripping action between the nose member and cable cover does not injure or affect the strength of the mechanical termination joint.

With continued reference to FIG. 5, cable outer protective cover 40 terminates immediately adjacent sleeve lead end 12'. Cover 56 which is heat shrunk around the termination sleeve and the braided sheath slightly overlaps cable outer protective cover 40' at that point so that the sheath will be fully covered over the longitudinal extent of the termination. Protective housing C provides further protection from environmental factors such as ultraviolet light and the like which might otherwise have destructively affected the cable at the termination area.

The concept as described above with reference to FIGS. 1-5 is believed to provide a valuable advance to the general state of the art. The new contraction termination device and method are relatively simple, inexpensive, readily installable directly in the field, reliable, strong and versatile. The basic inventive concepts involved may be adapted to many types and styles of practical installation for both the device itself as well as the inner strands or conductors. When using the inventive concepts, a mechanical termination joint is provided with a holding strength of up to 90 percent of the rated cable strength.

The concept has been described with reference to the preferred embodiment. Obviously, modifications and alterations will occur to others upon the reading and understanding of the specification. It is intended to include all such modifications and alterations insofar as they come within the scope of the appended claims or the equivalents thereof.

Having thus described my invention, I now claim:

1. A contraction termination device for a length of cable or the like having at least one inner strand surrounded at least by a braided sheath, said device comprising:

an elongated termination sleeve having opposed lead and terminal ends with an internal passageway communicating between said ends, said sleeve having an outward taper over at least a longitudinal portion thereof from said lead end toward said terminal end whereby said at least one inner strand is adapted to be received through said passageway from said lead end and said braided sheath is adapted to be received over and in surrounding relationship with at least a portion of said sleeve from said lead end; and, means for retaining said sheath over and in said surrounding relationship with said sleeve.

2. The device as defined in claim 1 wherein a portion of said sleeve adjacent said tapered area includes a roughened area extending longitudinally therealong.

3. The device as defined in claim 2 wherein said roughened area is defined by a plurality of spaced-apart ridge-like areas disposed peripherally around said sleeve.

4. The device as defined in claim 2 wherein at least said sleeve tapered and roughened areas include a material coating for providing high frictional surfaces therefor.

5. The device as defined in claim 1 wherein said retaining means comprises an intermediate area disposed between said sleeve tapered area and terminal end adapted to receive a portion of said braided sheath; and, affixing means for affixing said braided sheath to said sleeve at said intermediate area.

6. The device as defined in claim 5 wherein said intermediate area includes at least one peripherally disposed collar-like area extending radially outward therefrom, said affixing means being received between said at least one collar-like area and said sleeve terminal end.

7. The device as defined in claim 1 further including a protective covering received over at least a substantial portion of the braided sheath surrounding said sleeve.

8. The device as defined in claim 1 further including an elongated protective housing received over said sleeve and that portion of the braided sheath associated therewith, said protective housing including an area protruding outwardly from at least said sleeve lead end for providing bending strain relief for said cable.

9. The device as defined in claim 8 wherein said protective housing protruding area comprises a housing nose.

10. The device as defined in claim 9 wherein said nose comprises a separate nose member connected to said protective housing by a compression gland, said compression gland adapted to selectively force a portion of said nose member into clamping engagement with said cable outwardly of said sleeve lead end.

11. The device as defined in claim 1 wherein said sleeve terminal end includes means for receiving cable inner strand connecting means.

12. The device as defined in claim 1 further including device mounting means at least adjacent said sleeve terminal end.

13. A contraction termination device for sheathed braided electrical conductor type cable, said device comprising:

an elongated termination sleeve having opposed lead and terminal ends with an internal passageway communicating between said ends, said sleeve having an outward taper over at least a longitudinal portion thereof from said lead toward said terminal end and merging into a roughened area extending further toward said terminal end, said sleeve further including an intermediate area between said roughened area and said terminal end, whereby the electrical conductor is adapted to be received through said passageway from said lead end and the braided sheath is adapted to be received over and in surrounding relationship from said lead end with at least a portion of said sleeve including said intermediate area;

means for affixing said braided sheath to said sleeve at least at said intermediate area;

a protective covering received over at least a substantial portion of the braided sheath received over and surrounding said sleeve; and, an elongated protective housing received over said sleeve, the associated braided sheath and said protective covering, said housing being dimensioned to have an area thereof protruding outwardly from at least said sleeve lead end for providing bending strain relief for said cable.

14. The device as defined in claim 13 wherein at least said tapered, roughened and intermediate areas include a material coating for providing high frictional surfaces therefor.

15. The device as defined in claim 13 wherein said roughened area is defined by a plurality of spaced-apart ridge-like areas extending peripherally around said sleeve.

16. The device as defined in claim 13 wherein said intermediate area includes at least one collar-like area extending radially outward therefrom, affixing means being received between said collar-like area and sleeve terminal end.

17. The device as defined in claim 13 wherein said cover is constructed from a plastic material and is adapted to be placed in a close embracing relationship with the braided sheath surrounding said sleeve.

18. The device as defined in claim 13 wherein said protective housing protruding area comprises a housing nose area.

19. The device as defined in claim 18 wherein said nose area comprises a separate member connected to said protective housing by a compression gland, said compression gland adapted to selectively force a portion of said nose member into gripping engagement with said cable outwardly of said sleeve lead end.

20. The device as defined in claim 13 wherein said sleeve terminal end includes means for receiving conductor connecting means for said electrical conductors.

21. The device as defined in claim 13 further including device mounting means at least adjacent said sleeve terminal end.

22. The device as defined in claim 13 wherein said affixing means comprises mechanical means closely surrounding said braided sheath at said intermediate area.

23. A method for contraction termination of a length of cable or the like having at least one inner strand surrounded at least by a braided sheath, said method comprising the steps of:
(a) inserting said at least one inner strand through an internal passageway in a termination sleeve from the lead end thereof;
(b) passing a portion of the braided sheath surrounding said at least one inner strand over and in a surrounding relationship to a longitudinal portion of said sleeve from said lead end; and,
(c) affixing said braided sheath to said sleeve at an area spaced longitudinally from said lead end.

24. The method as defined in claim 23 further including the step of placing a protective covering in an embracing relationship with at least a substantial portion of said braided sheath surrounding said sleeve.

25. The method as defined in claim 23 further including the step of supporting said cable outwardly adjacent to said sleeve lead end.

26. The method as defined in claim 23 further including the step of gripping said cable outwardly adjacent to said sleeve lead end.

27. The method as defined in claim 24 further including the steps of placing a protective housing in a surrounding relationship with said sleeve, the braided sheath associated with said sleeve and said protective covering; and, dimensioning said protective housing for gripping and supporting said cable outwardly adjacent said sleeve lead end.

28. The method as defined in claim 23 including the step of mounting said sleeve adjacent the terminal end thereof for practical application.

29. The method as defined in claim 23 including the step of operably interconnecting said at least one strand to connecting means adjacent said sleeve terminal end.

* * * * *